United States Patent
Donaldson et al.

(10) Patent No.: US 12,216,801 B2
(45) Date of Patent: *Feb. 4, 2025

(54) CRYPTOGRAPHICALLY SECURE DYNAMIC THIRD PARTY RESOURCES

(71) Applicant: Visa International Service Association, San Francisco, CA (US)

(72) Inventors: James Donaldson, Belfast (IE); Bartlomiej Prokop, Belfast (IE)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/360,244

(22) Filed: Jul. 27, 2023

(65) Prior Publication Data
US 2023/0385454 A1    Nov. 30, 2023

Related U.S. Application Data

(63) Continuation of application No. 17/701,326, filed on Mar. 22, 2022, now Pat. No. 11,741,266, which is a
(Continued)

(51) Int. Cl.
*G06F 21/62* (2013.01)
*G06F 9/50* (2006.01)
(Continued)

(52) U.S. Cl.
CPC .......... *G06F 21/629* (2013.01); *G06F 9/5077* (2013.01); *G06F 21/10* (2013.01);
(Continued)

(58) Field of Classification Search
CPC ...... G06F 21/629; G06F 9/5077; G06F 21/54; G06F 21/602; G06F 21/10; H04L 9/3213;
(Continued)

(56) References Cited

U.S. PATENT DOCUMENTS 7,954,150 B2 *  5/2011  Croft ...................... H04L 67/08
                                                       726/21
8,341,270 B2 * 12/2012  Mazzaferri ........... G06F 21/629
                                                        718/1
(Continued)

FOREIGN PATENT DOCUMENTS

CN          1823513 A       8/2006
CN        102611709 A       7/2012
(Continued)

OTHER PUBLICATIONS

Extended European Search Report issued in App. No. EP20187257.9, dated Oct. 30, 2020, 7 pages.
(Continued)

*Primary Examiner* — Hosuk Song
(74) *Attorney, Agent, or Firm* — K&L Gates LLP (57) ABSTRACT

A system for providing updatable secure content resource. A content server may pay a content resource on the content author for an access by a requester. The content server receives a session request call from the requester prior to accessing the content resource. In response to the session request, the content server generates a session for the requester. The content server generates a payload that includes a location identifying the content resource on the content author and embeds the embedded cryptographic content. The content server transmits the generated payload to the requester. A resource server may receive an authentication access request in response to the embedded cryptographic content. In response to authenticating the authentication access request, the resource server provides the access to the requester.

20 Claims, 5 Drawing Sheets

Related U.S. Application Data continuation of application No. 16/532,467, filed on Aug. 5, 2019, now Pat. No. 11,288,399.

(51) Int. Cl.
*G06F 21/10* (2013.01)
*G06F 21/54* (2013.01)
*G06F 21/60* (2013.01)
*H04L 9/32* (2006.01)

(52) U.S. Cl.
CPC ............ *G06F 21/54* (2013.01); *G06F 21/602* (2013.01); *H04L 9/3213* (2013.01)

(58) Field of Classification Search
CPC . H04L 63/0428; H04L 63/083; H04L 67/141; H04L 67/146
See application file for complete search history.

(56) References Cited

U.S. PATENT DOCUMENTS

| | | | |
|---|---|---|---|
| 9,792,458 B2 | 10/2017 | Florez et al. | |
| 9,954,678 B2 | 4/2018 | Mosko et al. | |
| 10,225,239 B2 | 3/2019 | Eiriksson et al. | |
| 10,230,720 B2 | 3/2019 | Raepple et al. | |
| 10,445,509 B2* | 10/2019 | Thota | G06F 21/602 |
| 10,721,218 B2 | 7/2020 | Smith et al. | |
| 10,721,219 B2* | 7/2020 | Thorpe | H04L 63/166 |
| 10,785,021 B1 | 9/2020 | Prabhat et al. | |
| 11,038,677 B2 | 6/2021 | Sharfman et al. | |
| 11,134,068 B2* | 9/2021 | Aldis | H04N 21/47202 |
| 11,258,608 B1 | 2/2022 | Wooster et al. | |
| 11,277,266 B1 | 3/2022 | Wooster et al. | |
| 11,288,399 B2 | 3/2022 | Donaldson et al. | |
| 11,301,895 B2 | 4/2022 | Bitoun et al. | |
| 11,386,421 B2 | 7/2022 | Kumar et al. | |
| 11,741,266 B2* | 8/2023 | Donaldson | G06F 21/602 |
| | | | 713/167 |
| 2005/0015594 A1 | 1/2005 | Ashley et al. | |
| 2012/0072499 A1 | 3/2012 | Cipolli et al. | |
| 2016/0246897 A1 | 8/2016 | Kannan et al. | |
| 2016/0285861 A1 | 9/2016 | Chester | |
| 2016/0337354 A1 | 11/2016 | Smadja et al. | |
| 2017/0316185 A1 | 11/2017 | Park | |
| 2018/0069947 A1 | 3/2018 | Antipa et al. | |
| 2018/0139199 A1 | 5/2018 | Ahuja et al. | |
| 2018/0174231 A1 | 6/2018 | Chenard et al. | |
| 2020/0366696 A1 | 11/2020 | Willis | |
| 2021/0042430 A1 | 2/2021 | Donaldson et al. | |

FOREIGN PATENT DOCUMENTS

| | | |
|---|---|---|
| CN | 105095786 A | 11/2015 |
| CN | 107835155 A | 3/2018 |
| CN | 108234448 A | 6/2018 |
| CN | 109074578 A | 12/2018 |

OTHER PUBLICATIONS

Notice of Allowance dated Nov. 17, 2021 for U.S. Appl. No. 16/532,467 (pp. 1-5).

Office Action dated May 11, 2021 for U.S. Appl. No. 16/532,467 (pp. 1-19).

Office Action for corresponding Chinese Office Action No. 202010679061.0, dated Nov. 9, 2023.

* cited by examiner

CRYPTOGRAPHICALLY SECURE DYNAMIC THIRD PARTY RESOURCES

CROSS-REFERENCE TO RELATED APPLICATIONS

This application is a continuation application claiming priority under 35 U.S.C. § 120 to U.S. patent application Ser. No. 17/701,326, entitled CRYPTOGRAPHICALLY SECURE DYNAMIC THIRD PARTY RESOURCES, filed Mar. 22, 2022, which is a continuation of U.S. patent application Ser. No. 16/532,467, filed on Aug. 5, 2019, the entire contents of which are expressly incorporated by reference herein.

TECHNICAL FIELD

Embodiments discussed herein generally relate to providing content security to a third party content authors.

BACKGROUND

Online service providers or hosts provide a variety of services to customers or users. As online providers' web portals or apps for mobile device increase in scale and grow in geographical reach, having a distributed content delivery becomes essential. A content delivery network (CDN) is a system of distributed servers that deliver pages and other web content to users, based on the geographic locations of the users, the origin of the webpage and the content delivery server. This service is effective in speeding the delivery of content of websites with high traffic and websites that have global reach. The closer the CDN server is to the users geographically, the faster the content will be delivered to the users. CDNs may also provide protection from large surges in traffic.

At the same time, CDNs also provide a delivery platform for contents, such as JAVASCRIPT library files. For example, CDNs may host library files to be accessed by users. For example, users may include a Uniform Resource Locator (URL) or a Uniform Resource Identifier (URI) to point to or reference the library files via a web browser. As a part of security measure, web browsers include a Subresource Integrity (SRI) feature, which is a security feature that enables browsers to verify that resources that the web browsers fetch (for example, from a CDN) are delivered without unexpected manipulation. It works by allowing the content authors to provide a cryptographic hash that a fetched resource must match.

This approach, while providing the needed security in the event that the CDN may be attacked or compromised, has a significant drawback. For example, suppose the content authors wish to update the resource (e.g., library files), the content authors would need to create a new URL and provide a new security integrity hash to the updated content. The prior URL, with the prior hash should not be used. However, given the fact that the URL has been previously incorporated into the users' web pages or other applications, the content authors sometimes need to continue to maintain it instead of render the URL invalid or inactive, which may trigger havoc to the users' web pages or other applications.

Therefore, embodiments attempt to create a technical solution to address the deficiencies of the challenges above.

SUMMARY

Embodiments create a technical solution to the above challenges by modifying or updating the existing URL flow.

In one embodiment, a new URL flow alters existing or prior use by enforcing an upfront, authenticated request from the integrator to provision a "session" to use the resource. In one example, aspects of embodiments, prior to the use of the resource by a requester, the requester may issue a back-end authenticated call to provision a "session" for the use of the resource. In response to the call, a resource provider or a content author may create a "session," for the resource usage. Once the session is created, the content author may respond with a payload that includes the URL (host+path) to retrieve the latest version of the script+the SRI value to use when embedding that resource.

The requester may then accept this response to render the fully qualified script tag on their page along with expected SRI for maximum security. The requester may then proceed with their integration as per usual.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments overcome the challenges of the prior art of having a content author provide various versions of the encrypted content. Aspects of embodiments, alter the existing flow of the secured content provision. Before the access is permitted, the content author may establish a session with the requester. In response to the request for the session, the content server may respond with a payload with a location of the content resource and the authenticated information. The requester may then use the payload by incorporating it to the pages or content linking to the content resource.

Figure 1:
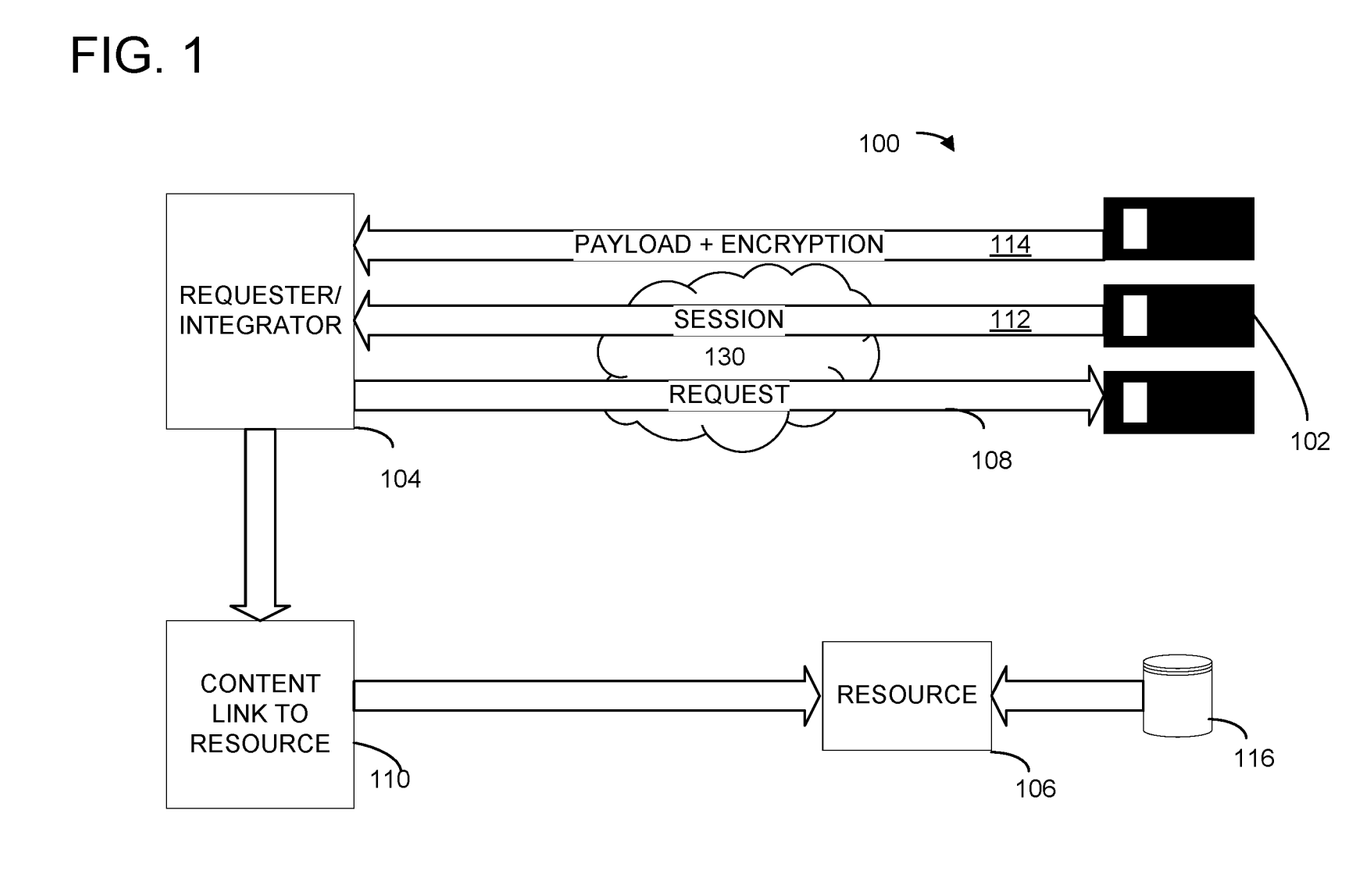
FIG. 1 is a system diagram for cryptographically secure dynamic third party scripts according to one embodiment.

Referring now to FIG. 1, a system 100 may provide a secure approach to enable update to content resources. A content author 102, as a third-party provider, may provide a plurality of resources 106 to be used by a requester 104. For example, the plurality of resources may include content resources 106, such as library files (e.g., .DLL files), JAVASCRIPT files (e.g., .js files), etc., for the requester 104. The requester 104 may link or refer to the content resources on a web page. In another example, the content resources 106 may be updated and that the requester 104 may wish to provide to devices such as mobile devices, etc. These devices (not shown) may access a content site 110 that is linked to the resource 106. In one embodiment, the content site 110 may be a web link. In another embodiment, the content site 110 may be a portal accessible from the devices via a software application (e.g., an app) for a mobile device.

For the sake of simplicity, the resource 106 in the following examples may be a JAVASCRIPT file "v1.2.5/lib.js" in a 1.2.5 version. The JAVASCRIPT file may include the needed functions that may be desirable by the requester or integrator 104.

In a further embodiment, the content author 102 may be a cluster of servers that are configured to provide hosting services for contents such that a requester may request access. In yet another embodiment, the content author 102 may be a host server that provides contents as part of a content delivery network (CDN) and provides a resource server 112 for provisioning the resource 106 on request or on demand. The requester 104 may access the resource 106 via a computer executable link (e.g., a uniform resource locator (URL) or a uniform resource identifier (URI)).

Figure 2:
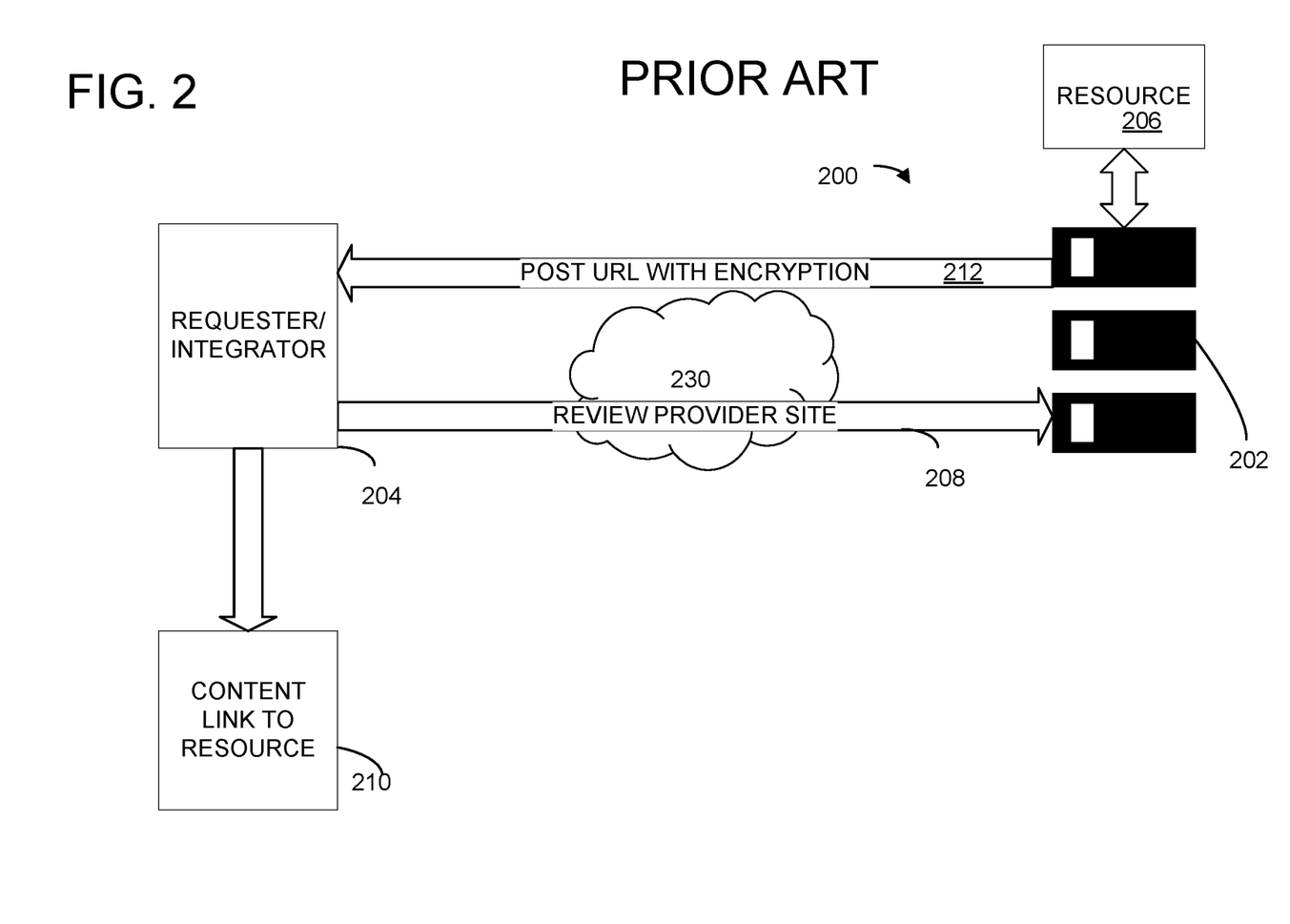
FIG. 2 is a system of a prior technology.

To further illustrate aspects of embodiments, referring now to FIG. 2, a system 200 of a prior approach. Typically when attempting to use by a requester 204 for a third party resource 206 hosted by a content author 202, the requester 204 may first locate or identify the resource 206 by visiting or reviewing at 208 a site of the provider 202. The provider 202 would post a link at 212, such as the URL, and the link would include the authentication needed. The requester or the integrator 204 embeds the URL on a content site 210.

In one example, suppose the content author 202 may provide a JAVASCRIPT resource for the requester 204. In such an example, the content author 202 may provide a specific version using the following URL tag:

<script src="https://example.com/resource/v1.2.5/lib.js">
</script>

For the latest version:

<script src="https://example.com/resource/latest/lib.js">
</script>

To provide further security, the content author 202 may provide an integrity hash to for use with the "specific version" URL:

<script src="https://example.com/resource/v1.2.5/lib.js"
    integrity="sha384-XXXXXXXXXX"
    crossorigin="anonymous"></script>

The requester or integrator 204 could then include the URL that points to the content 206 of "lib.js" in building the site or application of the requester or integrator 204.

As explained above, the existing configuration or approach of the system 200 does not permit frequent or convenient way to update to the content 206 when there is a different version to the one to which the URL is directed.

Referring back to FIG. 1, the requester or integrator 104 may not be able to review or identify the URL as in the system 200 as discussed. Instead, the requestor or integrator 104 may first place or send a request 108 to the content author 102. In one embodiment, the request 108 may not be made via a browser. In another embodiment, such request 108 may not be the request placed in the same communication channel as in the system 200 under 208. Rather, according to aspects of embodiments, the request 108 may be a server-to-server call or interaction. In one aspect, the request 108 may be considered as a set-up call or request so that the content author 102 may be noted about what is to be expected later.

In one embodiment, the server-to-server call or interaction may include an application programming interface (API) call between a service account of the requester or the integrator 104 and the server of the content author 102. In one example, such request 108 may not involve a user account of the requester or integrator 104, and may also be known as a "two-legged OAuth," or "2LO". In another example, the request 108 may include authentication. For example, the request 108 may include creating and cryptographically sign JSON Web Tokens (JWTs).

However, other authentication measures may be implemented without departing from the spirit and scope of aspects of embodiments. For example, the following authentication measures may be used:

Http Digest; and

Oauth.

Once the service provider 102 receives and processes the request 108, the server at the content author 102 may be configured to respond by creating a session 112. In one embodiment, the session 112 may a traditional type that the content author 102 maintains as part of its application stack. In another embodiment, the session 112 may be an issuing of a signed JSON Web Tokens that contain the payload information mentioned. Other implementations of the session 112 may be incorporated without departing from the spirit and scope of aspects of embodiments.

In one embodiment, the following may further illustrate the session setup or creation according to aspects of embodiments:

In this example, the HTTPS is the protocol used and the authentication used is HTTP Signature—both on request and response.

Http signature on response gives merchant assurance that SRI hash values comes from the payment processor network and may be trusted. When used properly with other security mechanism (e.g. CSP) this enables us to run unmodified code on cardholder devices.

The following example of codes may be implemented as a request from 'requester' to 'content author':

```
curl -H "Authorization: Bearer SrMCd1aqe6csoHmGnhN7 "
http://content.author.com/request/content/links
  > POST /gda/v1/captureContext HTTP/1.1
  > User-Agent: curl/7.29.0
  > Host: content.author.com
  > Authorization: Signature keyId="requestor-key", algorithm="rsa-sha256",
    headers="(request-target) host",
signature="qdx+H7PHHDZgy4y/Ahn9Tny9V3GP6YgBPyUXMmoxWtLbHpUnXS
2jo2+SbrQDMCJypxBLSPQR2aAj7ndmw2iicw3HMbe8VfEdKFYRqzic+efkb3eedi
v/x1xSHDJWeSWkx3ButlYSuBskLu6kd9Fswtemr3lgdDEmn04swr2Os0="
  > accept: */*
  > Content-Type: application/json
  {
    "requestedScripts": [
      {"name": "scriptA.js", "version": "v2"},
      {"name": "scriptB.js", "version": "v2.3"},
      {"name": "scriptC.js", "version": "v2.2"}
    ],
    "requestedStyles": [
      {"name": "styleA.css", "version": "v2"},
      {"name": "styleB.css", "version": "v2.3"},
      {"name": "styleC.css", "version": "v2.2"}
    ]
  }
```

In one embodiment, the response may provide look like the following:

```
< HTTP/1.1 200 OK
< Cache-Control: no-cache, no-store, must-revalidate
< Expires: Mon, 05 Aug 2019 12:22:50 GMT
< Digest: SHA-256=NjIxNWZhMmQ2MjMNjM3Yg==
< Authorization: Signature keyId="requestor-key", algorithm="rsa-sha256",
  headers="digest date expires",
signature="qdx+H7PHHDZgy4/Ahn9Tny9V3GP6YgBPyUXMmoxWtLbHpUnXS2j
o2+SbrQDMCJypxBLSPQR2aAjn7ndmw2iicw3HMbe8VfEdKFYRqzic+efkb3eedi
v/x1xSHDJWeSWkx3ButlYSuBskLu6kd9Fswtemr3lgdDEmn04swr2Os0=."
< Content-Type: application/json; charset=utf-8
< Date: Mon, 05 Aug 2019 11:22:50 GMT
{
  "scripts": [
    {"name": "scriptA.js", "url":
"https://moduleA.com/a/2/component.js", sri="sha384-
oqVuAfXRKap7fdgcCY5uykM6+R9GqQ8K/uxy9rx7HNQlGYI1kPzQho1wx4JwY8
wC"},
    {"name": "scriptB.js", "url": "https://content.com/js/scriptBv2.3.js",
sri="sha256-HS1ihgXZ6qfUcS5BTehJhV81EZR+I5Q6zx5yGdEqbp0="},
    {"name": "scriptC.js", "url": "https://server.com/scriptC-2.2.js",
sri="sha384-
kM3+BR0fKGmv8mDasMGLSHdqcbgWHUNWV1rAL+tkqnH578xS82vhlu9gR5B
HhBai"}
  ],
  "styles": [
    {"name": "styleA.css", "url": "https://moduleA.com/a/2/style.css",
sri="sha256-S20kSlaai+/AuQHj3KjoLxmxiOLT5298YvzpaTXtYxE= sha384-
zPPl2lM/NvKIsc8P59w39ivQ55JajkUigOm9RgHrVsDw7SL3cBEtcNZt9phwj2ff"},
    {"name": "styleB.css", "url":
"https://content.com/css/styleBv2.3.css", sri="sha256-
eOUokb/RjDw7kS+vDwbatNrLN8BIvvEhlLM5yogcDIo="},
    {"name": "styleC.css", "url": "https://server.com/styleC-2.2.css",
sri="sha384-
2kkuqwSCFze1y7UcAejUH6wt2MpQ4naa++zWP0SxyUC/jnwq91SAfe14RAruXt
nV"}
  ]
}
```

In one embodiment,

Hash—to provide merchants with SRI information, e.g. requested JS checksum.

Digital signatures (or equivalent) to allow merchants to validate that SRI information provided comes from us.

With the above authentication measures, aspects of embodiments may deliver to merchant the information that allow for rendering HTML page guaranteed to load only content authored by the content author or fail (if malicious content is served).

After creating the session 112, the content author 102 may generate a payload 114 with the requested link to the resource 106 with the needed authentication to be used under the SRI. In one embodiment, after the session created (e.g., via an Authenticated POST message to https://example.com/session), the requester 104 may receive back a payload containing details to use for the integration in the content site 110. In one example under JSON programming, the payload may include:

```
{
    "host": "https://example.com",
    "path": "/resource/X49vhxxRg",
    "integrity": "sha384-XXXXXXXXXX"
}
```

In such an example, a first field of the payload may include a location of the content resource 106. For instance, the URL may be "/resource/X49vhxxRg." In another embodiment, the content author 102 may provide a separate sever 116 to provide the resource 106. For example the server 116 may be a database server or a database store accessible by the content server of the content author 102 to handle such request calls.

In the same example, a second field of the payload may include a security specification. As illustrated above, the security specification may specify that an integrity hash may be a 384 bit value using a secure hash algorithm 2 (SHA-2) function. In one example, the SHA-2 functions may produce other hash values, such as SHA-224, SHA-256, SHA-384, SHA-512, SHA-512/224, SHA-512/256.

After receiving the payload and knowing the requested resource "v1.2.5/lib.js," the requester or integrator 104 may now embed the latest resource, whilst also setting the correct integrity hash as received from the payload:

<script src="https://example.com/resource/X49vhxxRg"
integrity="sha384-XXXXXXXXXX"
crossorigin="anonymous"></script>.

Aspects of embodiments provide the host/path information in a format that is conform to the URL in the original example, which further facilitate compatibility and background compatibility using the SRI via a web browser. Alternatively, in another embodiment, the payload may include a fully different URL that may respond with the correct content for the duration of the session created. In one aspect, the integration of the payload in the content site 110 that accesses the resource 106 may take place in a second communication channel (e.g., via the web browser) and not via the same first communication channel (e.g., server-to-server call). For example, the first communication channel differs from the second communication channel.

Furthermore, the content author 102 may also have the ability to dynamically modify the resource content 106 in response to the session parameters. For example the content author 102 may optimize the resource 106 to target a specific user agent engine (minify, polyfils etc.).

Figure 3:
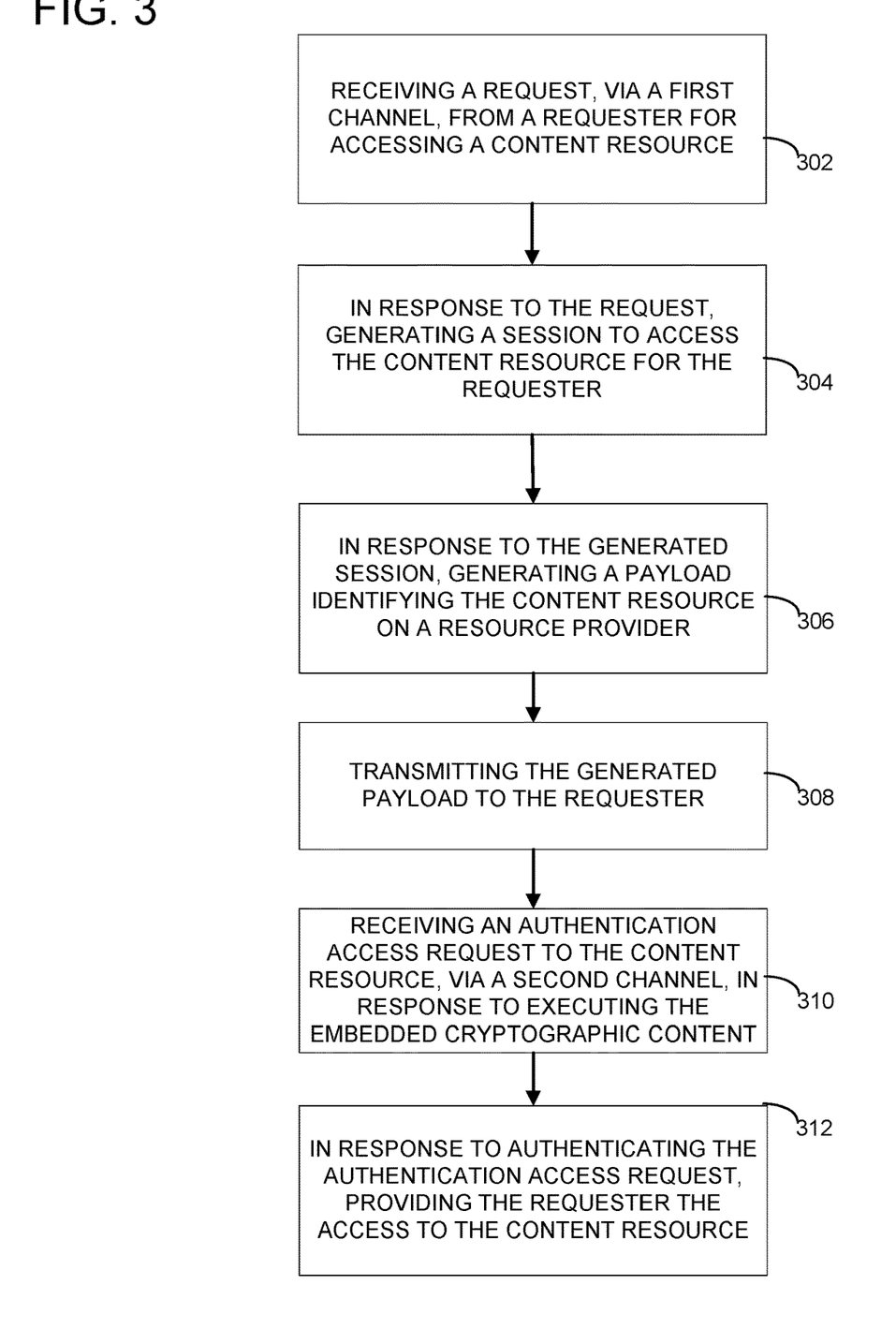
FIG. 3 is a flowchart illustrating a computerized method according to one embodiment.

Referring now to FIG. 3, a flow chart 300 illustrates a computer-implemented method for provide dynamically modifiable or updatable cryptographically secure third-party resources according to one embodiment. At 302, a content author (e.g., content author 102) may receive a request, via a first channel, from a requester for accessing a content resource. At 304, in response to the request, the content author may generate a session to access the content resource for the requester. At 306, in response to the generated session, the content author further may generate a payload identifying the content resource on a resource provider. In one example, the content author may generate the payload which further embeds a cryptographic content in the payload. In one example, the payload comprises a first data field identifying a location at the resource provider and a second data field for the cryptographic content.

At 308, the content author may transmit the generated payload to the requester. At 310, a resource provider may receive an authentication access request to the content resource, via a second channel, in response to executing the embedded cryptographic content. At 312, the resource provider may, in response to authenticating the authentication access request, provide the requester the access to the content resource.

In another embodiment, the resource provider 116 and the content author 102, while may be shown as separate reference identifiers in FIG. 1, it is to be understood that they may be part of the same cluster of servers providing resources and services to the requester or integrator 104.

Figure 4:
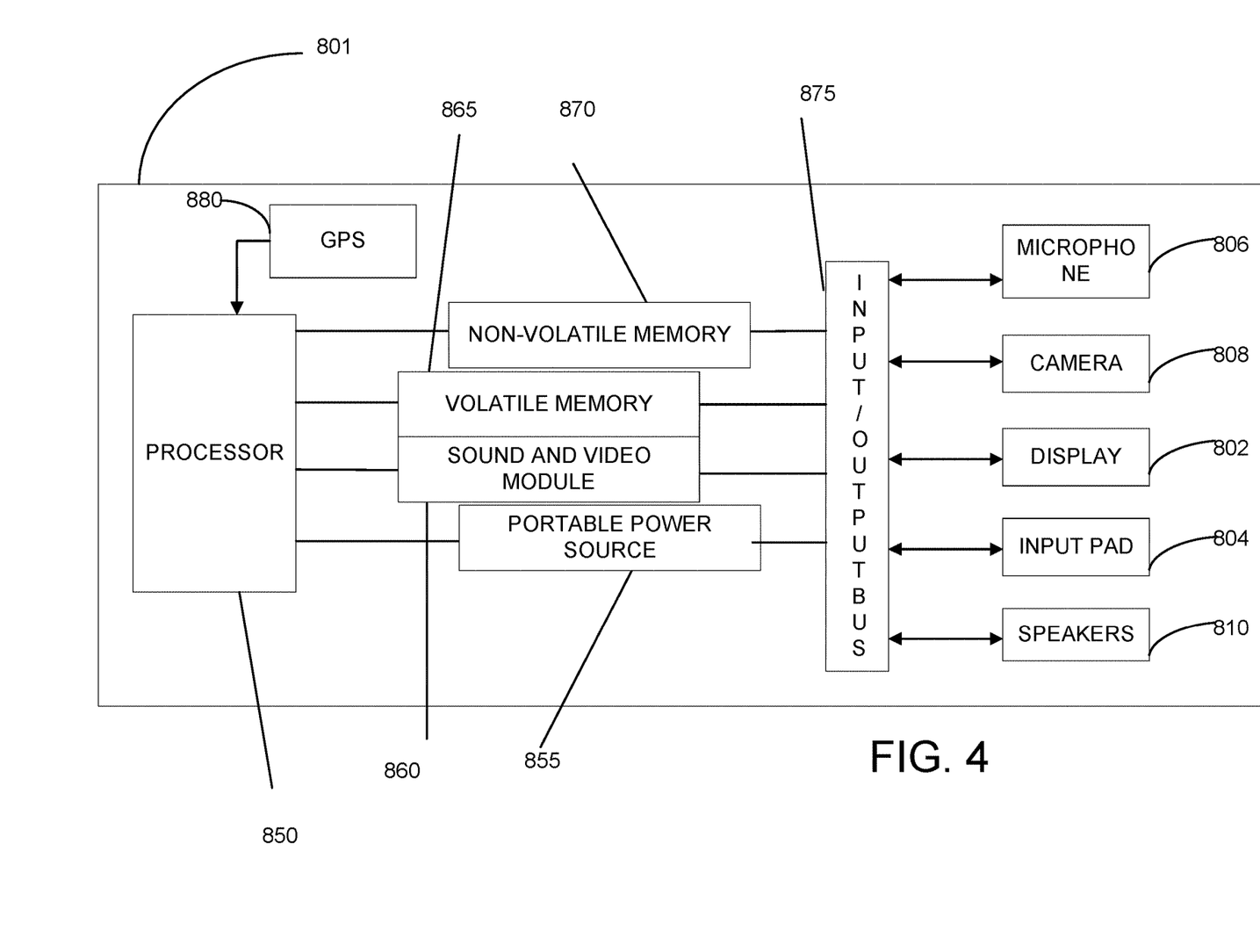
FIG. 4 is a diagram illustrating a portable computing device according to one embodiment.

FIG. 4 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 4 may be a simplified illustration of the physical elements that make up a portable computing device 801 and FIG. 5 may be a simplified illustration of the physical elements that make up a server type computing device 841.

FIG. 4 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc., It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 5:
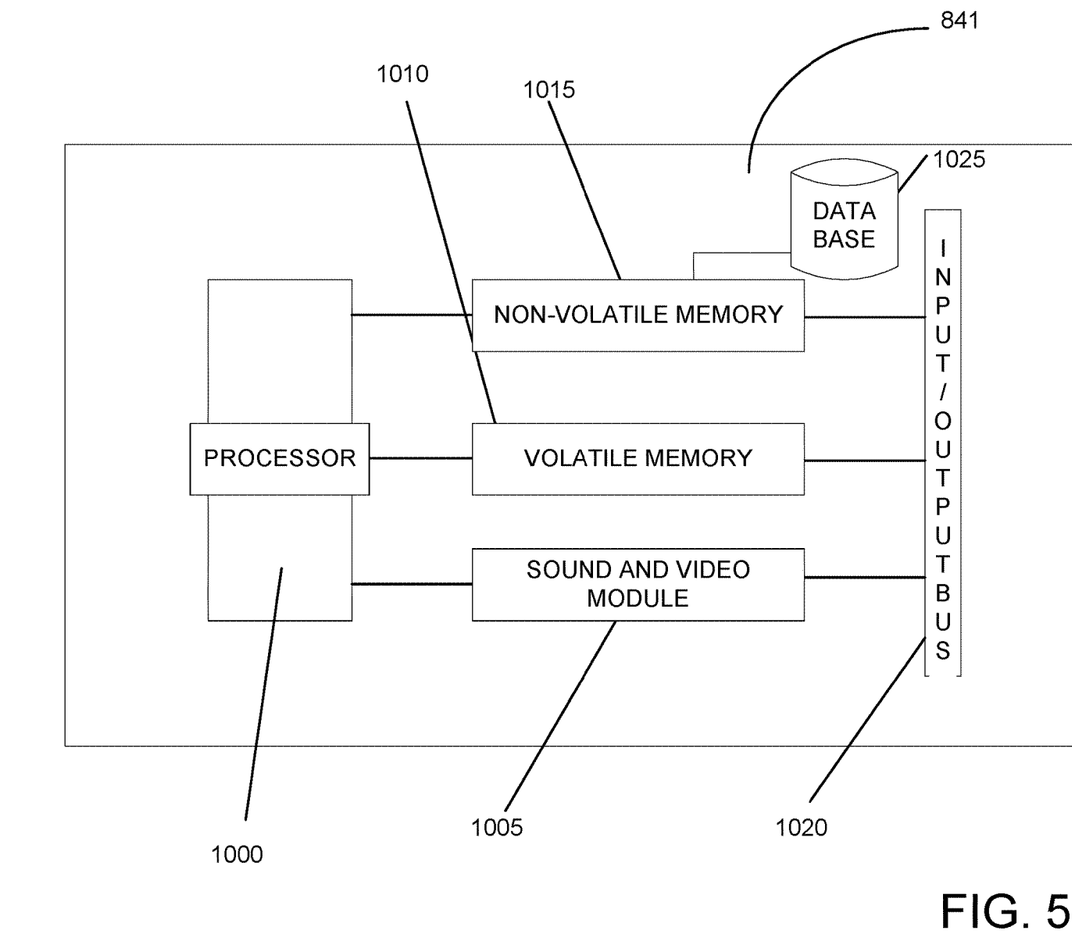
FIG. 5 is a diagram illustrating a computing device according to one embodiment.

The physical elements that make up the remote computing device 841 may be further illustrated in FIG. 5. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc., The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges dealing with the inability to update the latest authentication or cryptographic content associated with a third-party hosted resource. However, aspects of embodiments maintain the URL syntax without disturbing established protocol. Instead, embodiments change the flow of accessing the resource so that the content authors may send to the requester the latest version of the resource with the updated authentication or cryptographic content.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
    sending, by a requester, a request via a first communication protocol, for accessing a content resource;
    receiving, by the requester, a session at a content server to access the content resource for the requester;
    receiving, by the requester, a payload from the content server;
    identifying the content resource on a resource server, wherein the payload comprises a cryptographic content embedded in the payload, wherein the embedded cryptographic content is accessible via the content server;
    sending, by the requester, an authentication access request, via a second communication protocol, in response to executing the identified cryptographic content, wherein the second communication protocol is different from the first communication protocol; and
    receiving, by the requester, access to the content resource based on authenticating the authentication access request.

2. The computer-implemented method of claim 1, wherein the session comprises a server-to-server request call.

3. The computer-implemented method of claim 1, wherein the payload comprises a first data field identifying a location at a resource provider and a second data field for the cryptographic content.

4. The computer-implemented method of claim 1, wherein the content resource comprises computer software library executable files.

5. The computer-implemented method of claim 1, wherein the session comprises a timed application stack or a web token.

6. The computer-implemented method of claim 3, wherein the location comprises a uniform resource locator (URL) or a uniform resource identifier (URI).

7. The computer-implemented method of claim 1, wherein the second communication protocol comprises a subresource integrity (SRI) via a web browser.

8. The computer-implemented method of claim 1, wherein sending the request comprising sending an authentication in the request.

9. The computer-implemented method of claim 1, wherein sending the request comprises sending the request via a first channel.

10. A computer-implemented method comprising:
    receiving, by a content server, a request, via a first communication protocol, from a requester for accessing a content resource;
    generating, by the content server, a session at the content server to access the content resource for the requester;
    generating, by the content server, a payload identifying the content resource on a resource server;
    embedding, by the content server, a cryptographic content in the payload, wherein the embedded cryptographic content is accessible via the content server;
    transmitting, by the content server, the generated payload to the requester; and
    in response to authenticating an authentication access request, provide access to the content resource on the content server.

11. The computer-implemented method of claim 10, wherein the session comprises a server-to-server request call.

12. The computer-implemented method of claim 10, wherein the payload comprises a first data field identifying a location at a resource provider and a second data field for the cryptographic content.

13. The computer-implemented method of claim 10, wherein the content resource comprises computer software library executable files.

14. The computer-implemented method of claim 10, wherein the session comprises a timed application stack or a web token.

15. The computer-implemented method of claim 12, wherein the location comprises a uniform resource locator (URL) or a uniform resource identifier (URI).

16. The computer-implemented method of claim 10, wherein the second communication protocol comprises a subresource integrity (SRI) via a web browser.

17. The computer-implemented method of claim 10 comprising, modifying, by the content resource, the resource in response to session parameters.

18. The computer-implemented method of claim 10 comprising, modifying, by the content server, the resource based on a session parameter.

19. The computer-implemented method of claim 10 comprising, providing, by the content server, a separate server to provide the resource.

20. The computer-implemented method of claim 10, wherein receiving the request comprises receiving the request via a first channel.

* * * * *